United States Patent
Kuo et al.

(10) Patent No.: US 6,710,111 B2
(45) Date of Patent: Mar. 23, 2004

(54) POLYMER NANOCOMPOSITES AND THE PROCESS OF PREPARING THE SAME

(75) Inventors: Wen-Faa Kuo, Hsinchu (TW); Jeng-Yue Wu, Taichung (TW); Mao-Song Lee, Hsinchu (TW); Shyh-Yang Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 446 days.

(21) Appl. No.: 09/859,394

(22) Filed: May 18, 2001

(65) Prior Publication Data

US 2002/0086932 A1 Jul. 4, 2002

(30) Foreign Application Priority Data

Oct. 26, 2000 (TW) ........................................ 89122542 A

(51) Int. Cl.[7] .................................................. C08K 3/34
(52) U.S. Cl. ........................ 524/445; 524/442; 524/446; 524/449; 524/451
(58) Field of Search ................................. 524/445, 442, 524/446, 449, 451

(56) References Cited

U.S. PATENT DOCUMENTS 5,883,173 A * 3/1999 Elspass et al. ............... 524/446
6,162,857 A * 12/2000 Trexler, Jr. et al. ......... 524/445

\* cited by examiner

*Primary Examiner*—Edward J. Cain
(74) *Attorney, Agent, or Firm*—Sughrue Mion, PLLC

(57) ABSTRACT

The present invention relates to a polymer nanocomposite and the process for preparation of the same, wherein a positive-electric polyelectrolyte, a layer-structured inorganic material, such as silicate clay, and a polymer latex comprising an negative-electric surface are "co-agglutinated" to result in a polymer nanocomposite.

20 Claims, 11 Drawing Sheets

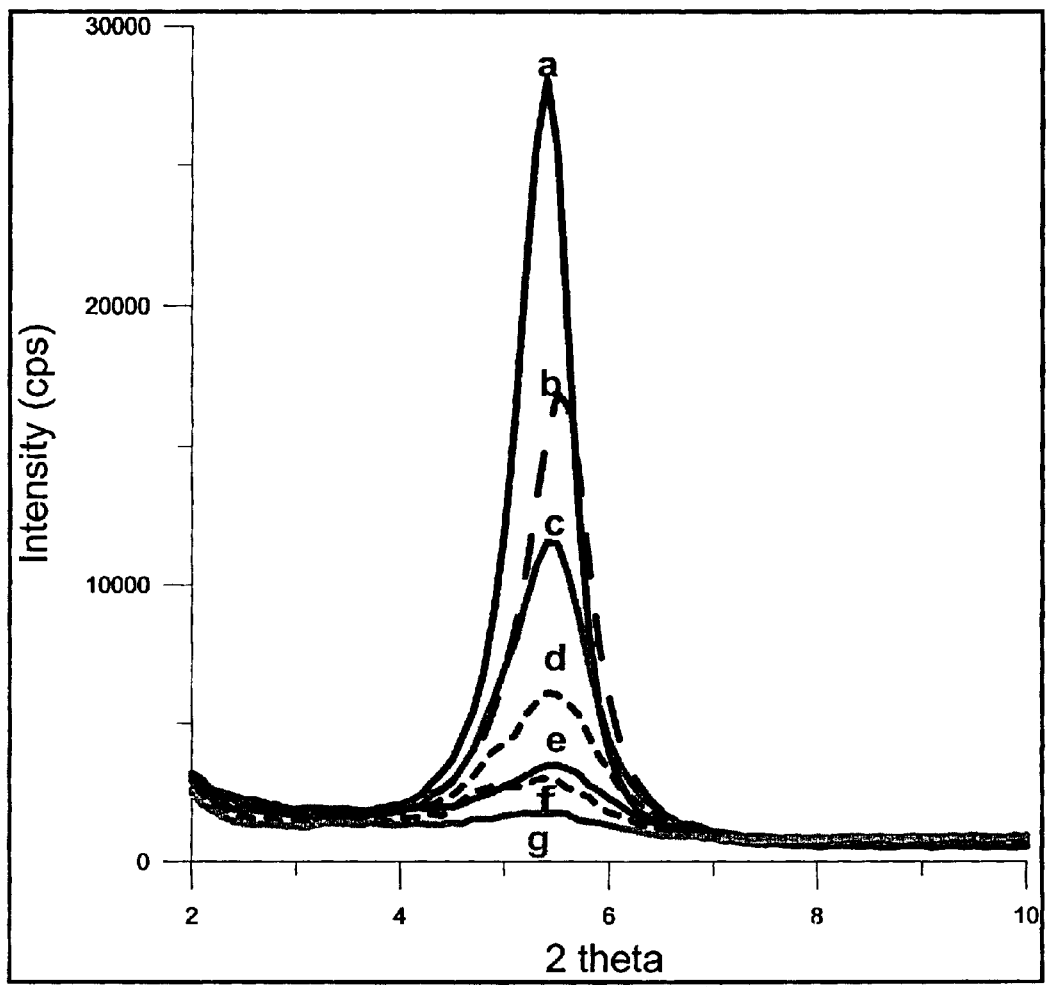
FIG.1 X-ray diffractogram of the clay/SBR mixture : (a) CCS-110 Clay/SBR=25% ; (b) CCS-111 Clay/SBR=12.8% ; (c) CCS-112 Clay/SBR=6.4% ; (d) CCS-113 Clay/SBR=2.7% ; (e) CCS-114 Clay/SBR=1.7% ; (f) CCS-115 Clay/SBR=1.0% ; (g) CCS-116 Clay/SBR=0.7%

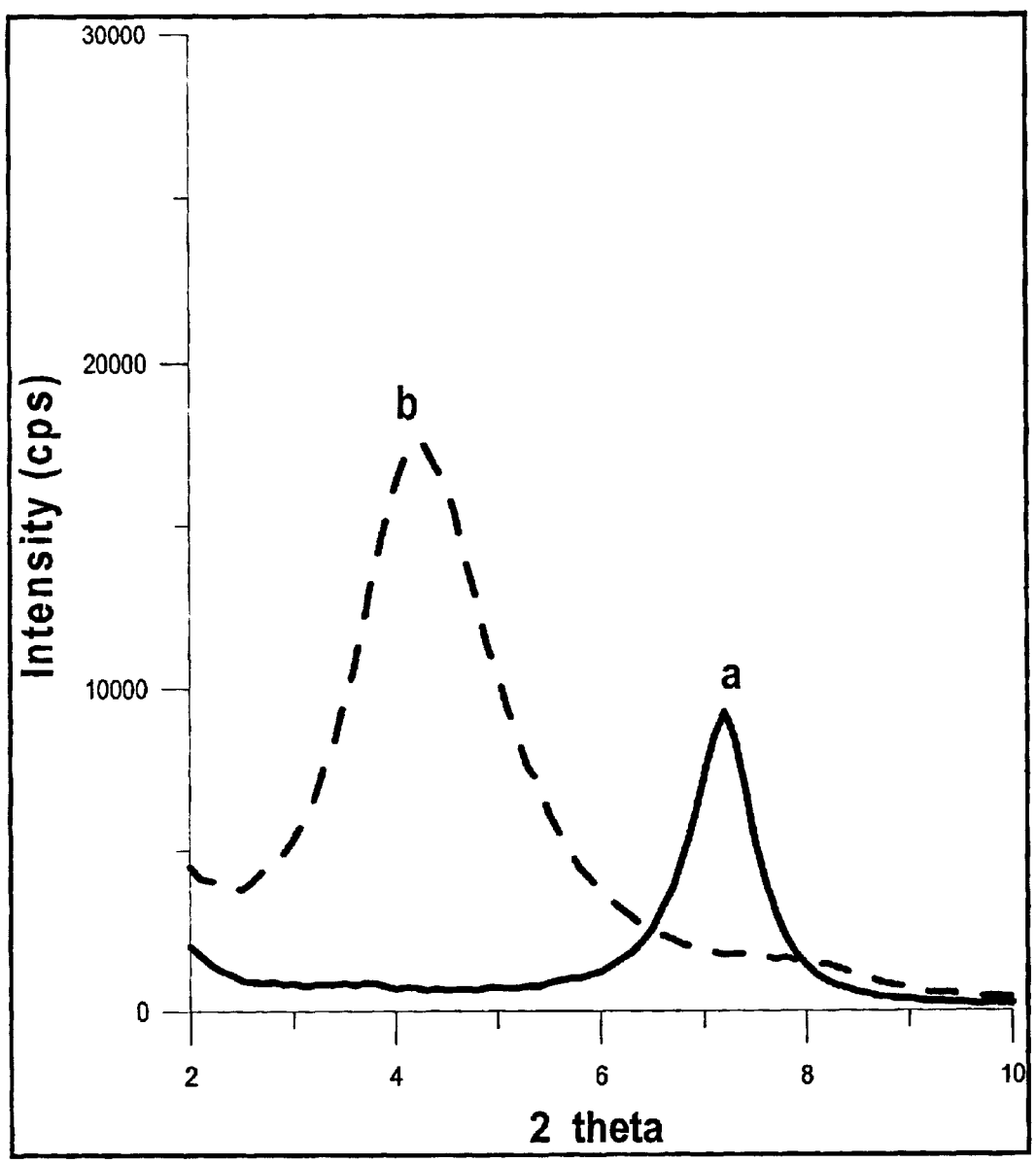
FIG. 2 X-ray diffractogram of pure clay, clay/polyelectrolyte: (a) pure clay (Kunipia F) ; (b) clay/polyelectrolyte composite(CCH-01)

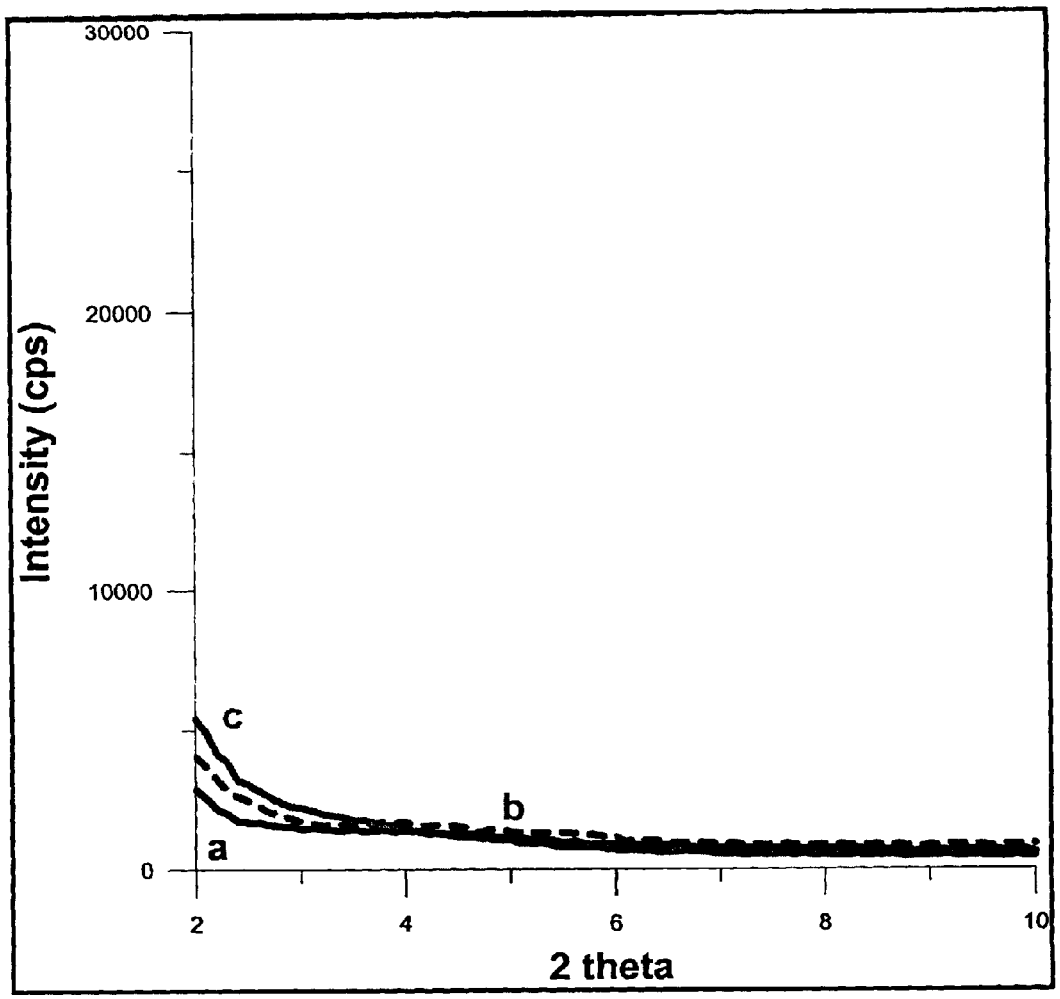
FIG. 3 X-ray diffractogram of the clay/polyelectrolyte/SBR nanocomposite (total electrical charge ratio of CPE/Clay is 5): (a) CCS-95 Clay/SBR=1.7%; (b) CCS-94 Clay/SBR=2.4%; (c) CCS-93 Clay/SBR=5.1%

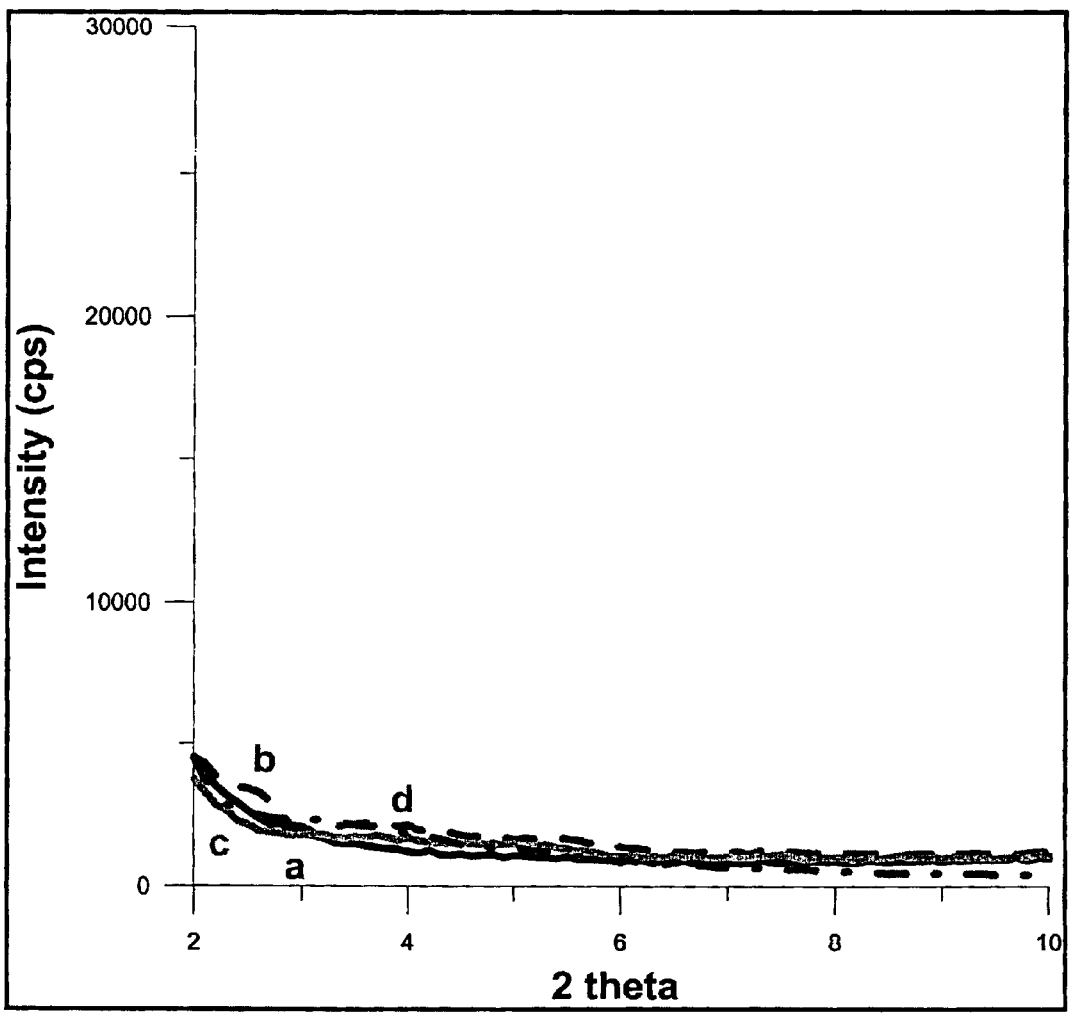
FIG. 4 X-ray diffractogram of the clay/polyelectrolyte/SBR nanocomposite (total electric charge ratio of CPE/Clay is 7):
(a) CCS-106  Clay/SBR=1.0%; (b) CCS-105  Clay/SBR=1.6%; (c) CCS-104  Clay/SBR=2.3%; (c) CCS-103  Clay/SBR=4.8%

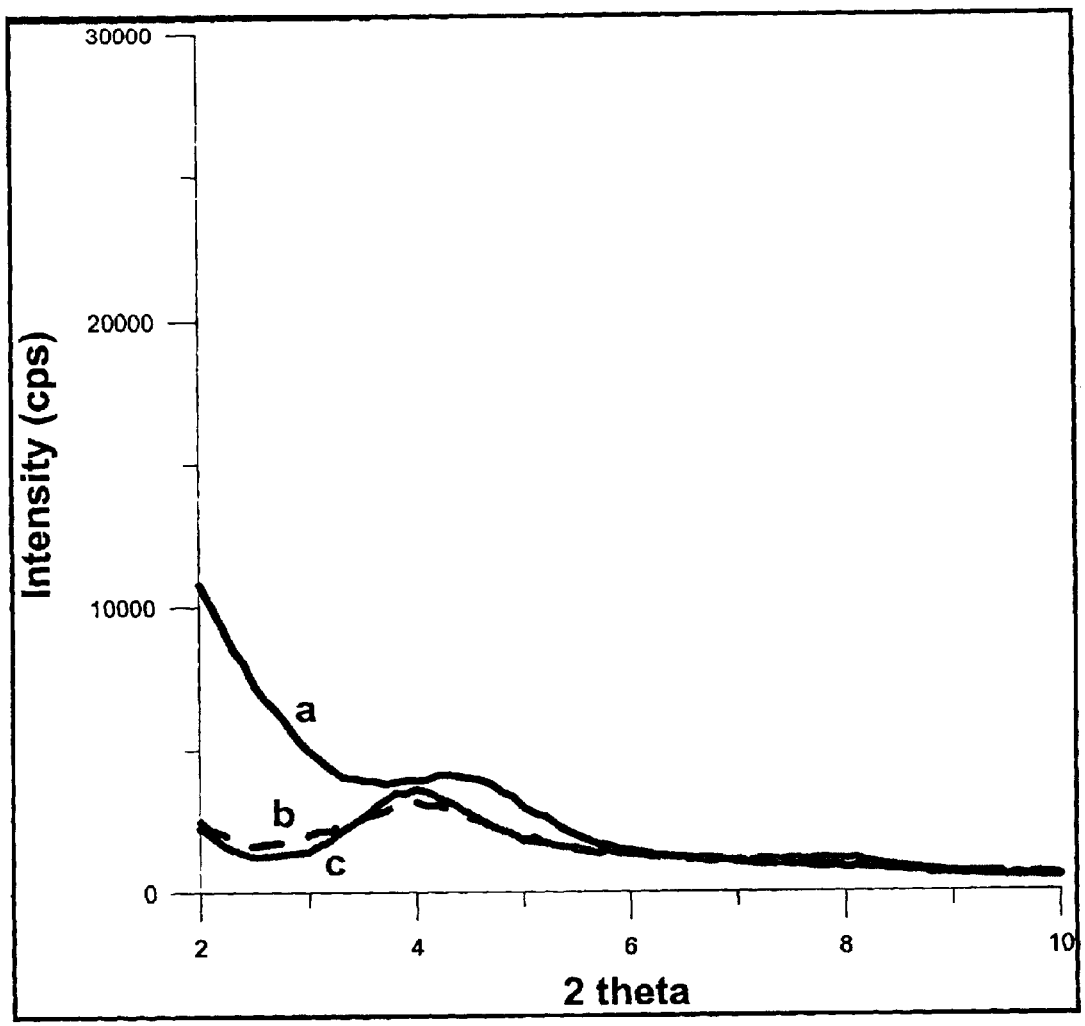
FIG. 5 X-ray diffractogram of the clay/polyelectrolyte/SBR nanocomposite (the total electric charge ratio of CPE/Clay is 5): (a) CCS-92 Clay/SBR=10.2%; (b) CCS-91 Clay/SBR=17.0%; (d) CCS-90 Clay/SBR=34.0%

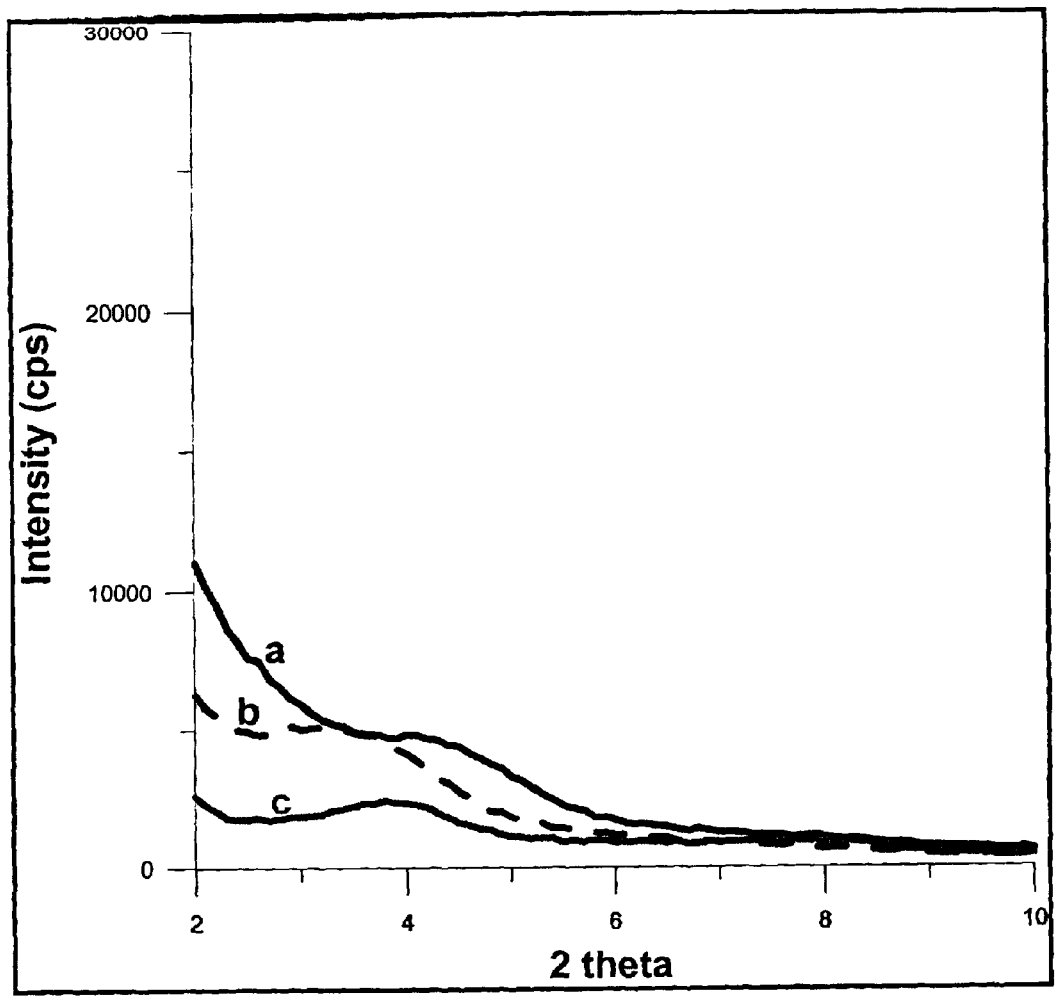
FIG. 6 X-ray diffractogram of the clay/polyelectrolyte/SBR nanocomposite (the total electric charge ratio is 7): (a) CCS-102 Clay/SBR=9.7% ; (b) CCS-101  Clay/SBR=16.2% ; (c) CCS-100 Clay/SBR=32.3%

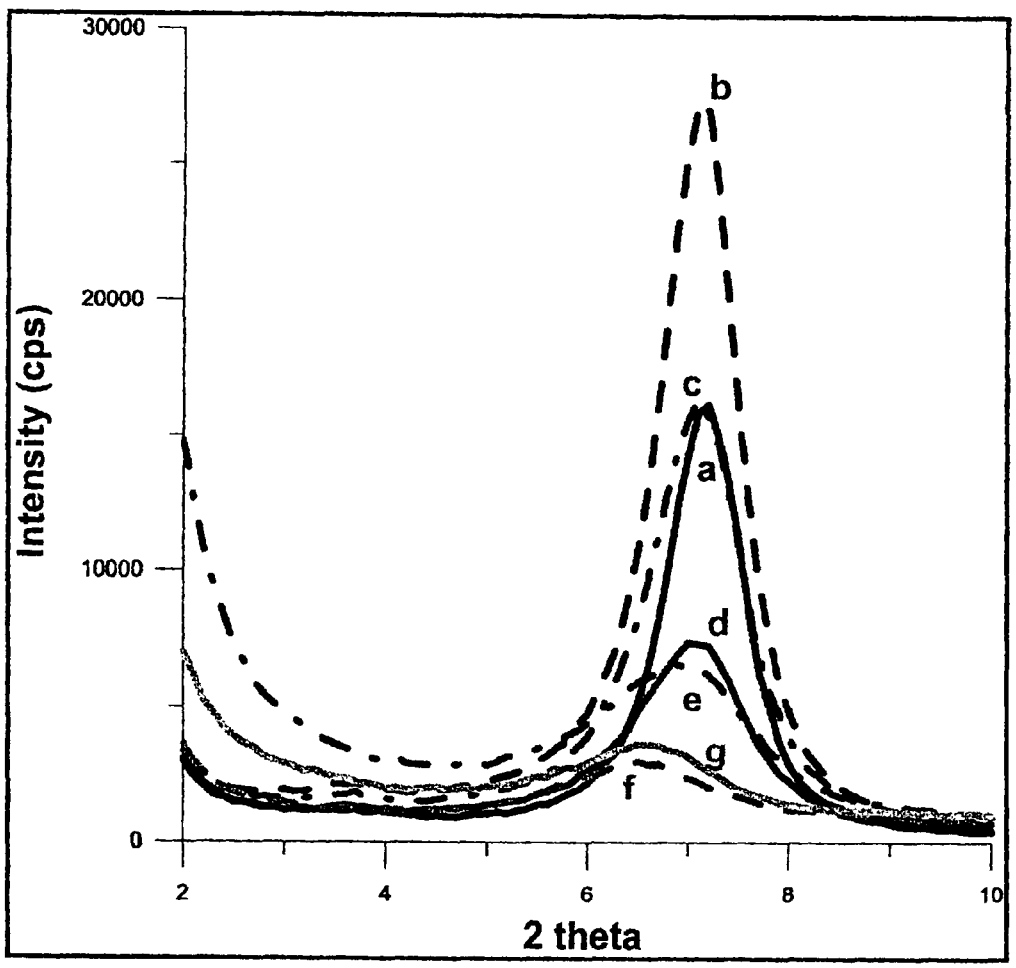
FIG. 7 X-ray diffractogram of the clay/PMMA mixture : (a) CCM-30 Clay/PMMA=23.1% ; (b) CCM-31 Clay/PMMA=11.5% ; (c) CCM-32 Clay/PMMA=5.8% ; (d) CCM-33 Clay/PMMA=2.5% ; (e) CCM-34 Clay/PMMA=1.5% ; (f) CCM-35 Clay/PMMA=0.9% ; (g) CCM-36 Clay/PMMA=0.6%

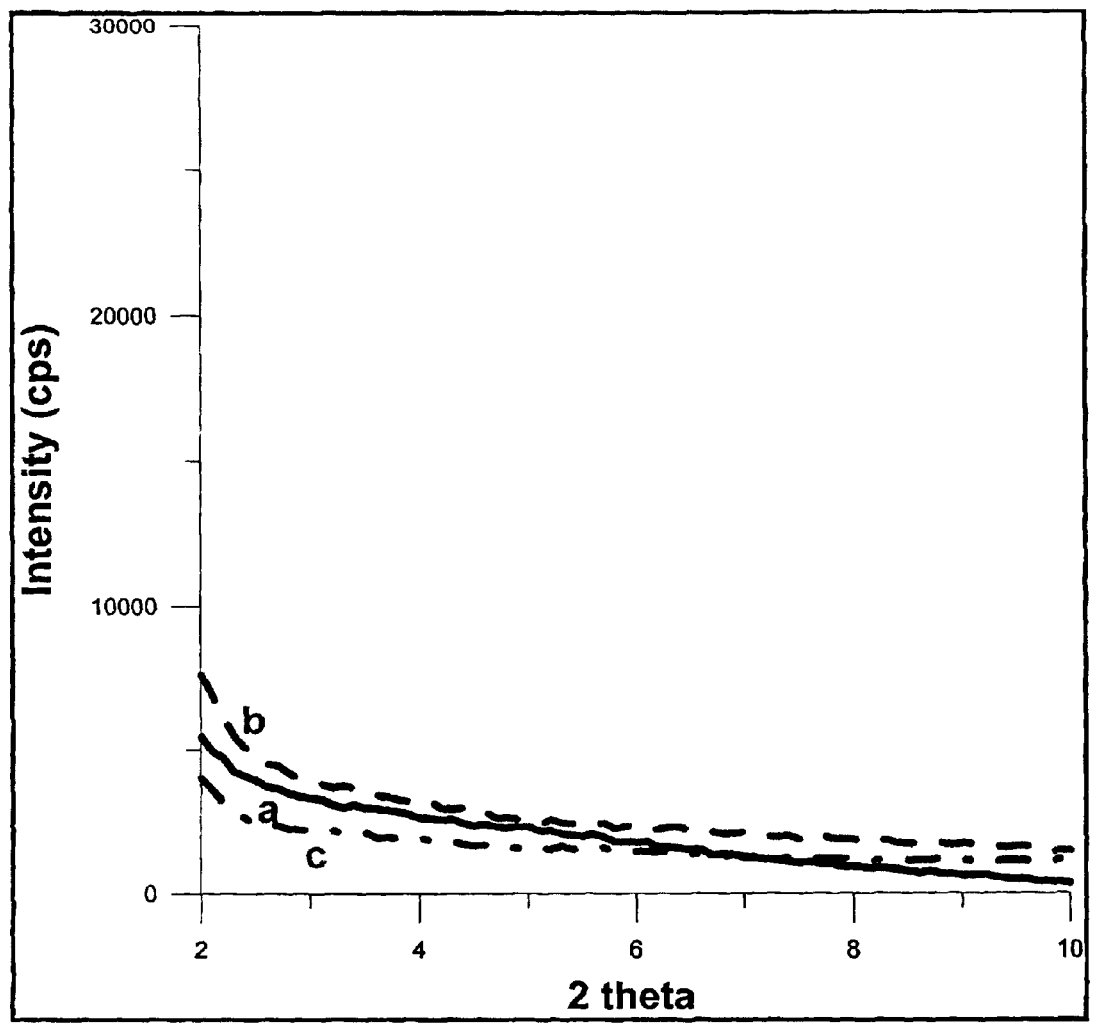
FIG. 8 X-ray diffractogram of the clay/polyelectrolyte/PMMA nanocomposite (the total electric charge ratio of CPE/Clay is 5): (a) CCM-26 Clay/PMMA=0.9%; (b) CCM-25 Clay/PMMA=1.5%; (c) CCM-24 Clay/PMMA=2.2%

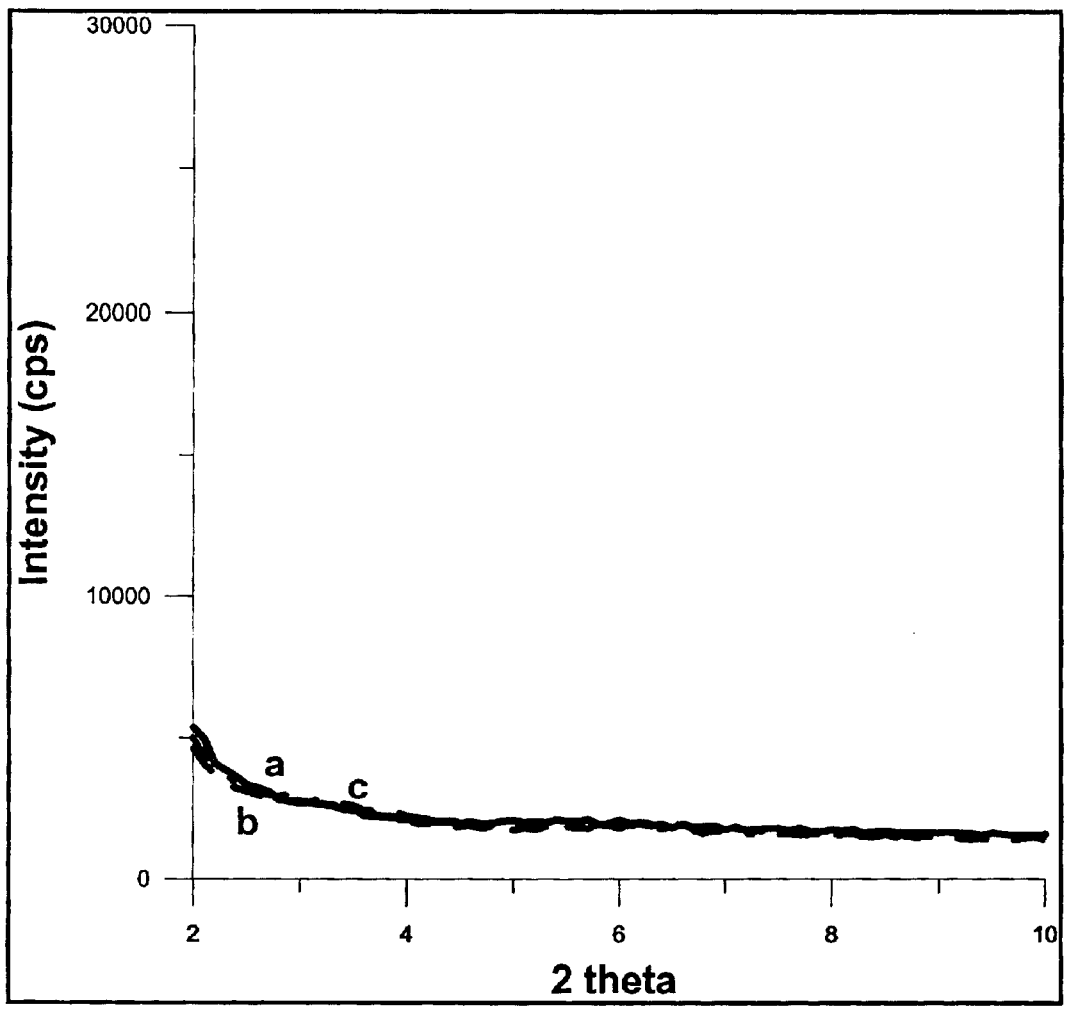
FIG. 9 X-ray diffractogram of the clay/polyelectrolyte/PMMA nanocomposite (the total electric charge ratio of CPE/Clay is 7): (a) CCM-46 Clay/PMMA=0.9%; (b) CCM-45 Clay/PMMA=1.5%; (c) CCM-44 Clay/PMMA=2.0%

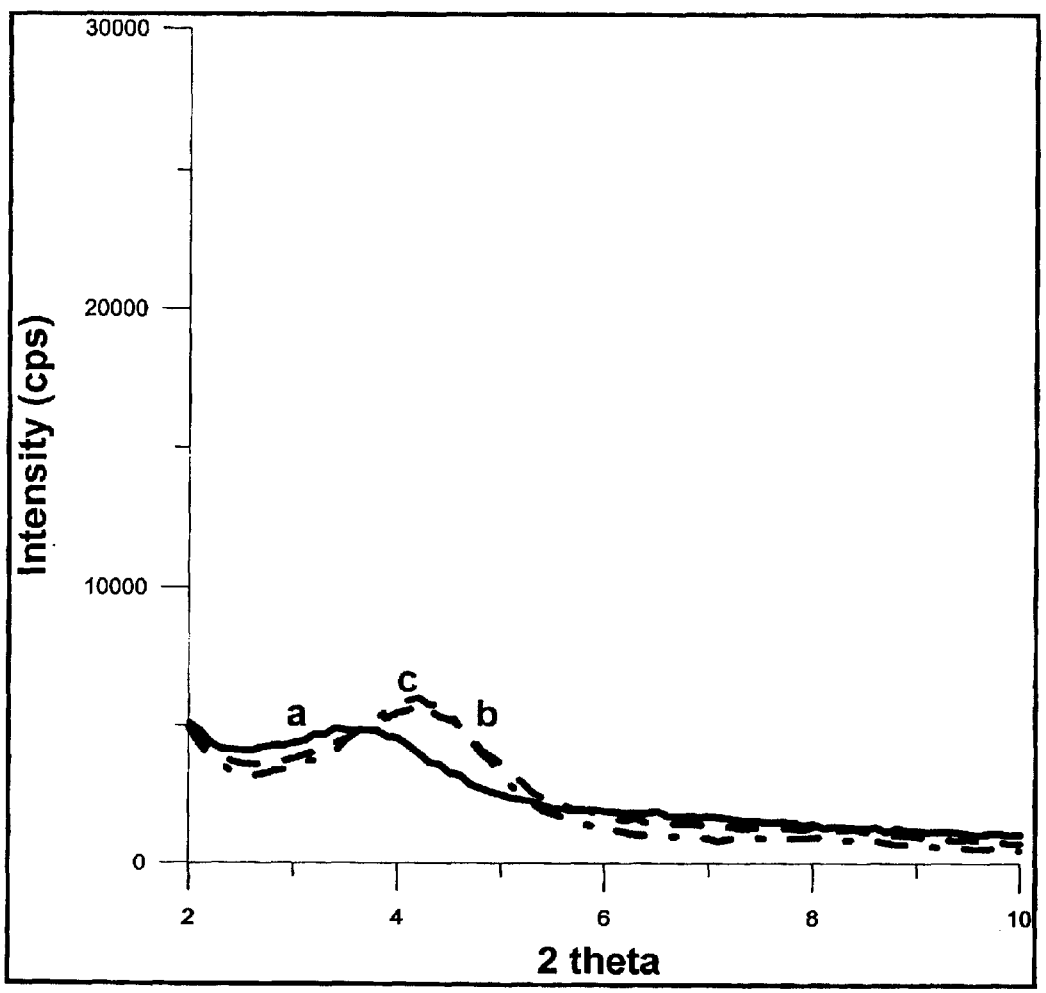
FIG. 10 X-ray diffractogram of the clay/polyelectrolyte/PMMA nanocomposite (the total electric charge ratio of CPE/Clay is 5): (a) CCM-22 Clay/PMMA=9.2%; (b) CCM-21 Clay/PMMA=15.4%; (c) CCM-20 Clay/PMMA=30.8%

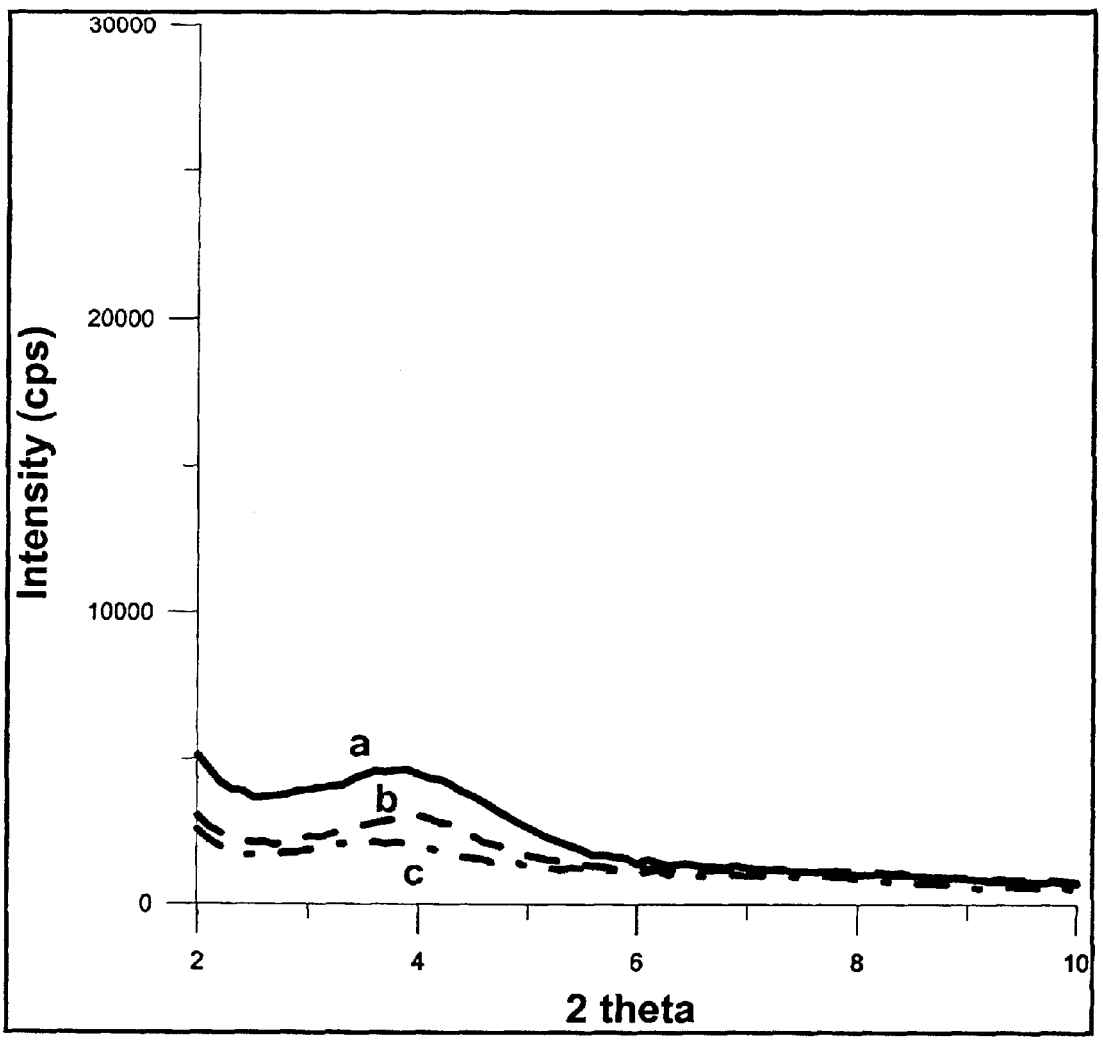
FIG. 11 X-ray diffractogram of the clay/polyelectrolyte/PMMA nanocomposite (the total electric charge of CPE/Clay is 7):
(a) CCM-42  Clay/PMMA=8.8% ; (b) CCM-41  Clay/PMMA=14.6% ; (c) CCM-40  Clay/PMMA=29.2%

POLYMER NANOCOMPOSITES AND THE PROCESS OF PREPARING THE SAME

BACKGROUND OF THE INVENTION

1. Field of the Invention

The present invention relates to polymer nanocomposites of layer structured inorganic/polyelectrolyte/organic polymer, and a method of preparing the same.

2. Description of the Prior Art

Nanocomposites are the composites that the diameter of its dispersed particles are in the range of 1–100 nm. In particular, the nanocomposites contain layered inorganic material, such as clay, which has the characteristics of nanoscale layer thickness, a high aspect ratio, and ionic bonding between layers. As a result, the material has high strength, high rigidity, high resistance to heat, low moisture absorption, low gas permeability and can be multiple recycled for reuse. The currently available commercial product of this nano-composites material is Nylon 6/clay from Ube Company, Japan, which is used in vehicle parts and air-blocking wrapping films (1990); and from Unitika Company, Japan, which is used in vehicle parts and as an engineering plastic (1996).

Conventional methods to produce nanocomposites are: (1) in-situ polymerization, (2) kneading and (3) coagulation and sedimentation. Nylon 6 nanocomposite has been successfully commercialized by in-situ polymerization. However, this method is successful for Nylon 6 nanocomposites only until to now. Moreover, although kneading is convenient, the equipment is considerably expensive and the relative techniques are very complex. It has not been commercialized.

As for coagulation and sedimentation, most research, such as *Applied Clay Science* volume 15 (1999), pages 1~9, has shown that it is hard to avoid the re-coagulate of the layered inorganic material. For example, the preparation methods of nanocomposite of Styrene-Butadiene Rubber (SBR) as disclosed in the journal of Special Rubber Products, issued by Beijing-Univ-Chem-Technol in China, volume 19 (2), pages 6~9, 1997, include:

(1) Latex method: Vigorously stirring the aqueous to allow clay dispersed in water, SBR latex and antioxidant are then added and uniformly mixed. The mixture is coagulated with the addition of diluted hydrochloric acid. After it is washed with water and dried, clay/SBR nanocomposite is obtained. The lattice spacing of the clay is expanded from 0.98 nm of pure clay to 1.46 nm. This indicates that SBR molecules inserted between layers of clay to form intercalated nanocomposites.

(2) Solution method: Modify the clay by organic chemicals and the obtained clay is vigorously stirred to disperse in toluene. A SBR-toluene solution is then added and the mixture is stirred vigorously to become a uniform mixture. After it is sedimented and dried, clay/SBR nanocomposite is obtained. The lattice spacing of clay is expanded from 0.98 nm of pure clay to 1.90 nm after it is organically modified, and further expanded from 1.90 nm to 4.16 nm in clay/SBR nanocomposite. This indicates that more SBR molecules are inserted into layers of clay than the above latex method. Nevertheless, this method uses a large amount of toluene, which causes the production cost to increase and the occurrence of environmental problems.

From the above, it is found that the biggest breakthrough for coagulation and sedimentation is how to easily and effectively prevent the coagulation of layered inorganic material itself. This invention solves the problem by using polyelectrolytes with multiple charges to prevent the coagulation of layered inorganic material. At the same time, the polyelectrolytes are used as coagulant between layered inorganic material and polymer latex.

SUMMARY OF THE INVENTION

The first object of the invention is to provide a easy "coagulation" method to produce polymer nanocomposites.

The second object of the invention is to provide a method to produce polymer nanocomposites in aqueous and/or including the addition of small amounts of organic solvents.

The third object of the invention is to prepare a polylmer nanocomposite containing polyelectrolyte.

The fourth object of the invention is to provide the preparation of a layered inorganic material/polyelectrolyte/polymer latex nanocomposites and the method of preparing the same. In the invention, the used polyelectrolyte contains opposite charges relative to that of the layered inorganic material and the polymer latex.

To achieve the above-mentioned objects, the invention introduces polyelectrolytes to the solution of the layered inorganic material, such as a clay solution, and a polymer latex. The clay is fully dispersed in water, and the polyelectrolyte with opposite charges to clay is then added to form a complex through the combination of the relative opposite charges in clay and polyelectrolyte. Extra charges of the polyelectrolyte of the complex will combine again with the surface charges of the polymer latex. By way of these coagulations, a well-dispersed nanocomposite of layered inorganic material/polyelectrolyte/polymer latex is formed.

In more detail, the method of preparing polymer nanocomposites of the invention comprises the following steps: (a) combining layered inorganic material, such as clay, and polyelectrolyte in a water solution to form a complex, wherein the polyelectrolyte contains extra amount of opposite charges relative to the clay, and this charge combination will adsorb the polyelectrolyte onto the clay; and (b) adding the complex in (a) to a polymer latex, wherein the polymer latex contains opposite charges relative to the polyelectrolyte, and by way of cogulation, a composite of layered inorganic material/polyelectrolyte/polymer latex is formed.

The polymer nanocomposites of the invention comprise of (a) high molecular polymer as a matrix; (b) layered inorganic material, which is dispersed in the matrix of high molecular polymer; and (c) polyelectrolyte, which contains opposite charges relative to the layered inorganic material and is adsorbed onto the layered inorganic material.

Compared to the prior art, the characteristics of the invention include:

(1). In comparison to the latex method mentioned in the journals, the introduction of polyelectrolyte in the invention leads to a coagulation process, wherein the opposite charges carried by polyelectrolyte relative to the clay and polymer latex results in the combination of the clay, the polymer latex and the polyelectrolytes. As a result, the method to obtain nanocomposites do not need additional equipment and other cost except the polyelectrolytes.

(2). In comparison to the solution method, this invention avoids the use of large amounts of organic solvents.

BRIEF DESCRIPTION OF THE DRAWINGS

This invention will be more fully understood from the detailed description given hereinbelow and the accompanying drawings. This description is given by way of illustration only and thus not intended to be limitative of the present invention.

FIG. 1 shows the X-ray diffractogram of the clay/SBR mixture, wherein (a) CCS-110 Clay/SBR=25%; (b) CCS-111 Clay/SBR=12.8%; (c) CCS-112 Clay/SBR=6.4%; (d) CCS-113 Clay/SBR=2.7%; (e) CCS-114 Clay/SBR=1.7%; (f) CCS-115 Clay/SBR=1.0%; (g) CCS-116 Clay/SBR=0.7%.

FIG. 2 shows the X-ray diffractogram of the clay/CPE mixture, wherein (a) pure clay (Kunipia F); (b) CCH-01 (clay/CPE).

FIG. 3 shows the X-ray diffractogram of the clay/CPE/SBR nanocomposite, wherein the total charge ratio of the CPE/clay is 5: (a) CCS-95 Clay/SBR=1.7%; (b) CCS-94 Clay/SBR=2.4%; (c) CCS-93 Clay/SBR=5.1%.

FIG. 4 shows the X-ray diffractogram of the clay/CPE/SBR nanocomposite, wherein the total charge ratio of CPE/clay is 7: (a) CCS-106 Clay/SBR=1.0%; (b) CCS-105 Clay/SBR=1.6% (c) CCS-104 Clay/SBR=2.3%; (d) CCS-103 Clay/SBR=4.8%.

FIG. 5 shows the X-ray diffractogram of the clay/CPE/SBR nanocomposite, wherein the total charge ratio of the CPE/clay is 5: (a) CCS-92 Clay/SBR=10.2%; (b) CCS-91 Clay/SBR=17.0%; (c) CCS-90 Clay/SBR=34.0%.

FIG. 6 shows the X-ray diffractogram of the clay/CPE/SBR nanocomposite, wherein the total charge ratio of CPE/clay is 7: (a) CCS-102 Clay/SBR=9.7%; (b) CCS-101 Clay/SBR=16.2%; (c) CCS-100 Clay/SBR=32.3%.

FIG. 7 shows the X-ray diffractogram of the clay/PMMA mixture: (a) CCM-30 Clay/PMMA=23.1%; (b) CCM-31 Clay/PMMA=11.5%; (c) CCM-32 Clay/PMMA=5.8%; (d) CCM-33 Clay/PMMA=2.5%; (e) CCM-34 Clay/PMMA=1.5%; (f) CCM-35 Clay/PMMA=0.9%; (g) CCM-36 Clay/PMMA=0.6%.

FIG. 8 shows the X-ray diffractogram of the clay/CPE/PMMA nanocomposite, wherein the total charge ratio of CPE/clay is 5: (a) CCM-26 Clay/PMMA=0.9%; (b) CCM-25 Clay/PMMA=1.5%; (c) CCM-24 Clay/PMMA=2.2%.

FIG. 9 shows the X-ray diffractogram of the clay/CPE/PMMA nanocomposite, wherein the total charge ratio of CPE/clay is 7: (a) CCM-46 Clay/PMMA=0.9%; (b) CCM-45 Clay/PMMA=1.5%; (c) CCM-44 Clay/PMMA=2.0%.

FIG. 10 shows the X-ray diffractogram of the clay/CPE/PMMA nanocomposite, wherein the total charge ratio of CPE/clay is 5: (a) CCM-22 Clay/PMMA=9.2%; (b) CCM-21 Clay/PMMA=15.4%; (c) CCM-20 Clay/PMMA=30.8%.

FIG. 11 shows the X-ray diffractogram of the clay/CPE/PMMA nanocomposite, wherein the total charge ratio of CPE/clay is 7: (a) CCM-42 Clay/PMMA=8.8%; (b) CCM-41 Clay/PMMA=14.6%; (c) CCM-40 Clay/PMMA=29.2%.

DETAILED DESCRIPTION OF THE INVENTION

When the water solutions of the layered inorganic material (the following will be in reference to clay, but it is not meant to be limitative of the invention) combine and coagulate with the polymer latex, due to the negative charges carried by both the latex and clay, they can not be intensive mixed and coagulated. Hence this invention introduces a polyelectrolyte carrying opposite charges, such as cationic polyelectrolyte (CPE), in the process. The well-dispersed clay will first mix with polyelectrolyte, wherein the total amount of charges of the added polyelectrolyte is excessively greater than the charges carried by the clay, consequently the complex of clay/CPE carries extra positive charges. Thereafter, the extra charges of the complex will combine with the polymer latex particles, which carries the negative charges. By way of coagulation, a well-dispersed clay/polyelectrolyte/polymer nanocomposite is formed.

The clay used in this invention is preferably layered silicates which carry negative charges in water. The cationic exchange equivalent is preferably between 30 and 200 meq/100 g. The suitable clays are, for example, smectite clay, vermiculite, halloysite, sericite, fluoro-mica, etc. The smectite clay includes: montmorillonite, saponite, beidellite, nontronite, hectorite, stevensite, etc. The fluoro-mica can be artificially synthesized, for example, combining and heating mixtures of 90~65 wt % of talc with 10~35 wt % of at least one selected from silicate fluoride, sodium fluoride and lithium fluoride.

Polyelectrolyte is a polymer having functional groups of multiple same charges. The polyelectrolyte used in the invention is preferably cationic polyelectrolyte, which usually contains relative negative charges, such as halogen ions, acetic acid ions, perchlorate ions for charge neutralization. The suitable cationic polyelectrolyte is poly(diallyl dimethylammonium chloride), poly(4-vinyl pyridine), etc.

The surrounding of the latex particles of the polymer latex in the invention carries negative charges, as a result, when it is combined with clay/CPE complex which carries extra positive charges, the coulomb forces between them will result in coagulation. Suitable polymer latex is rubber latex such as, styrene-butadiene rubber, isopropylene rubber, butadiene rubber, acrylonitrile-butadiene rubber, natural rubber. Moreover, other polymer latex, for example, PVC, PS, PMMA, and PU can be used as well.

According to the preparation method of the invention, clay and polyelectrolyte are first mixed in a state of "non-coagulate", wherein the polyelectrolyte is adsorbed onto the clay. To achieve this, clay is well dispersed in water, then the clay solution is added slowly in a stirring polyelectrolyte solution, so that coagulation is avoided. Based on this invention, the total electric charges of the added polyelectrolyte is preferable 1~10 times of that of the clay. Thereafater, the clay/polyelectrolyte mixture solution is added to a polymer latex. After sufficiently stirred, centrifuge separation, the coagulant of clay/polyelectrolyte/polymer is washed with water and dried to form a nanocomposite.

The nanocomposite obtained from the above method is comprised of: (a) 60~99 wt % of high molecular substrate; (b) 0.5~30 wt % of layered clay, which is well dispersed in the high molecular substrate; and (c) 0.5~30 wt % of polyelectrolyte, which carries opposite charges of the clay and is adsorbed onto the clay. The lattice spacing of the layered clay in the nanocomposite is grater than 2.0 nm. Preferably it is greater than 4.0 nm or is exfoliated completely.

The following example is intended to illustrate the invention more fully without limiting its scope, since numerous modifications and variations will be apparent to those skilled in this art.

The materials used in the following embodiments are as follows:

A. Cationic Polyelectrolyte; CPE 20 wt % of poly(diallyl dimethylammonium chloride) having a molecular weight of 100,000~200,000

B. Clay Kunipia F ionic exchange equivalent CEC=115 meq/100 g surface area A=750 m$^2$/g(BET surface area)

C. SBR latex particle diameter: about 68 nm Zeta Potential: −31 m volts with negative charge, solid concentration of about 23.5 wt %

D. PMMA latex solid concentration of about 65 wt %

E. CaCl$_2$ solution solution with 2.0 wt % concentration

Comparative Embodiment 1: The Preparation of Clay/SBR Mixture

Untreated kunipia F was added in water and the concentration is adjusted to 0.5 wt % to form a well-dispersed clay solution A. Latex B was formed by adding SBR latex with water and the solid concentration was adjusted to 2.35 wt %. Different amounts of clay solution A was poured into a certain amount of SBR latex B and the mixture was mixed completely to form a uniform latex. Then a few drops of CaCl$_2$ solution was added to form a precipitate. After the precipitate was separated by a centrifuge, it was washed with water and dried. Consequently, clay/SBR mixtures with different amounts of clay were obtained. The compositions are listed in Table 1. From the graph of X-ray analysis (FIG. 1), it is discovered that regardless of the amounts of clay, an obvious absorbent peak is present when angle 2θ is about 5.5 degrees. As the amount of clay increases, the intensity of absorbant peaks increases (CCS-110~CCS-116). The lattice spacing of clay is about 1.6 nm. However, the graph of the X-ray of the pure clay (FIG. 2) shows an absorbant peak when angle 2θ is 7.0 degrees (the lattice spacing was calculated to be 1.2 nm). Comparing the two, the lattice spacing of the clay/SBR mixture was not evidently opened.

with a centrifuge and dried. The obtained clay was then measured with X-ray for its lattice spacing. The result shows that after CPE is incorporated into clay, the lattice spacing of clay is expanded from 1.22 nm to 2.10 nm (FIG. 2), which proves that cationic polyelectrolyte was inserted into the clay layers.

(b). Preparation of Clay/Polyelectrolyte/SBR Nanocomposites

The obtained clay/polyelectrolyte solution C was added into a stiring SBR latex according to the compositions listed in Table 2 and 3. The obtained uniform latex was then separated with a high speed centrifuge, water washed, dried to form nanocompositions with different amounts of clays.

The X-ray diffractograms (FIGS. 3 and 4) indicate that when the amount of clay is lower than 10 wt %, (Sample CCS-95, CCS-94, CCS-93 of Table 2; CCS-103, CCS-104, CCS-106 of Table 3) there is no evident absorbent peak present when angle 2θ is between 2 and 10 degrees. This proves that most of the clay layer was opened completely and is dispersed uniformly into the SBR substrate, which in turn proves the existence of polyelectrolyte can actually improve the dispersion of clay in SBR. On the other hand, when the amount of clay increases (CCS-92, CCS-91, CCS-90 of Table 2; CCS-102, CCS-101, CCS-100 of Table 3), FIGS. 5 and 6 show that there are weak absorbent peaks present when angle 2θ is between 4.0 and 4.3 degrees (FIG. 5) and between 3.2 and 3.9 degrees (FIG. 6). As the amount of clay increases, the intensity of absorbent peaks also increases. Comparing the position of the absorbent peaks of this embodiment with comparative embodiment 1, it is indicated that the lattice spacing of clay of this embodiment

TABLE 1

| Sample | | CCS-110 | CCS-111 | CCS-112 | CCS-113 | CCS-114 | CCS-115 | CCS-116 |
|---|---|---|---|---|---|---|---|---|
| Clay/H$_2$O$^{(1)}$ | g | 60 | 30 | 15 | 8 | 5 | 3 | 2 |
| Clay weight | g | 0.3 | 0.15 | 0.075 | 0.032 | 0.02 | 0.012 | 0.008 |
| SBR Latex$^{(2)}$ | g | 50 | 50 | 50 | 50 | 50 | 50 | 50 |
| SBR weight | g | 1.175 | 1.175 | 1.175 | 1.175 | 1.175 | 1.175 | 1.175 |
| CaCl$_2$$^{(3)}$ | ml | 15 | 10 | 6 | 6 | 6 | 6 | 10 |
| coagulant weight | g | 1.3 | 1.16 | 1.03 | 1.1 | 1.08 | 1.1 | 1.06 |
| efficiency | % | 88.14% | 87.55% | 82.40% | 91.14% | 90.38% | 92.67% | 89.60% |
| amount of Clay/SBR$^{(4)}$ | % | 25.5 | 12.8 | 6.4 | 2.7 | 1.7 | 1.0 | 0.7 |
| X-ray diffractogram | | | | | | | | | |
| peak angle (2θ) | ° | 5.40 | 5.50 | 5.40 | 5.40 | 5.50 | 5.40 | 5.50 |
| d-spacing | (Å) | 16.35 | 16.05 | 16.35 | 16.35 | 16.05 | 16.35 | 16.05 |
| peak intensity | (kcps) | 26.62 | 15.42 | 10.24 | 4.60 | 2.19 | 1.49 | 0.24 |

Note:
$^{(1)}$Clay/H$_2$O was formed by adding pure clay kunipia F in water to form a well dispersed 0.5 wt % solution.
$^{(2)}$SBR solution was formed by adding high concentration SBR latex in water to form a latex with solid content of 2.35 wt % solution.
$^{(3)}$The concentration of the CaCl$_2$ solution is 2.0 wt %.
$^{(4)}$The amount of Clay/SBR added is the ratio of the weight of the clay to the weight of the SBR.

Embodiment 1: The Preparation of Clay/Polyelectrolyte/SBR Nanocomposites (a). The Preparation of Clay/Polyelectrolyte Solution Solution A for preparing clay was prepared by uniformly diapering 5 g of kunipia F in 1000 g of water. 2 wt % of polyelectrolyte solution B was prepared with CPE. Certain amount of clay solution A was added in polyelectrolyte solution B to make a clay/polyelectrolyte solution C, wherein the total number of moles of the charges of polyelectrolyte is 5 or 7 times to that (i.e. ion exchange equivalent) of the clay. A portion of solution C was filtered is larger than that of the comparative embodiment 1. It is also noticed that when the two embodiments contain similar content of clay, the peak intensity of this embodiment is evidently smaller, hence there is still a small portion of clay separated by inserting a lattice. Comparing FIGS. 5 and 6, the total number of moles of charges of polyelectrolyte is 5 times the total number of moles of charges of clay, however, the latter is 7 times greater. It is shown that the absorbent peak of FIG. 6 is not evident, which indicates that the polyelectrolyte is able to promote the dispersion of clay in SBR.

TABLE 2

| Sample | | CCS-90 | CCS-91 | CCS-92 | CCS-93 | CCS-94 | CCS-95 |
|---|---|---|---|---|---|---|---|
| CCH-01(1/5)[1] | g | 100 | 50 | 30 | 15 | 7 | 5 |
| Clay weight | g | 0.4 | 0.2 | 0.12 | 0.06 | 0.028 | 0.02 |
| CPE weight | g | 0.37 | 0.185 | 0.111 | 0.0555 | 0.0259 | 0.0185 |
| SBR Latex[2] | g | 50 | 50 | 50 | 50 | 50 | 50 |
| SBR weight | g | 1.175 | 1.175 | 1.175 | 1.175 | 1.175 | 1.175 |
| coagulant weight | g | 1.42 | 0.99 | 0.96 | 1.12 | 0.9 | 1 |
| efficiency | % | 73.0% | 63.5% | 68.3% | 86.8% | 73.2% | 82.4% |
| amount of Clay/SBR[3] | % | 34.04 | 17.02 | 10.21 | 5.11 | 2.38 | 1.70 |
| X-ray diffractogram | | | | | | | |
| peak angle (2θ) | degree | 4.00 | 4.00 | 4.30 | ~ | ~ | ~ |
| d-spacing | (Å) | 22.07 | 22.07 | 20.53 | ~ | ~ | ~ |
| peak intensity | (kcps) | 2.39 | 1.73 | 0.93 | ~ | ~ | ~ |

Note:
[1]CCH-01(1/5) solution was formed by uniformly dispersing a homogeneous 0.5 wt % clay solution in a 2.0 wt % CPE solution (solution C of embodiment 1), wherein the concentration of clay is 0.40 wt % and the concentration of CPE is 0.37 wt %.
[2]SBR latex was formed by adding water to high concentration SBR latex to form a latex of solid content of 2.35 wt %.
[3]The amount of Clay/SBR added is the ratio of the weight of clay to that of SBR.

TABLE 3

| Sample | | CCS-100 | CCS-101 | CCS-102 | CCS-103 | CCS-104 | CCS-105 | CCS-106 |
|---|---|---|---|---|---|---|---|---|
| CCH-02(1/7)[1] | g | 100 | 50 | 30 | 15 | 7 | 5 | 3 |
| Clay weight | g | 0.38 | 0.19 | 0.114 | 0.057 | 0.0266 | 0.019 | 0.0114 |
| CPE weight | g | 0.49 | 0.245 | 0.147 | 0.0735 | 0.0343 | 0.0245 | 0.0147 |
| SBR Latex[2] | g | 50 | 50 | 50 | 50 | 50 | 50 | 50 |
| SBR weight | g | 1.175 | 1.175 | 1.175 | 1.175 | 1.175 | 1.175 | 1.175 |
| coagulant weight | g | 1.36 | 1.09 | 0.86 | 0.84 | 0.87 | 0.9 | 1.01 |
| efficiency | % | 66.5% | 67.7% | 59.9% | 64.3% | 70.4% | 73.9% | 84.1% |
| amount of Clay/SBR[3] | % | 32.34 | 16.17 | 9.70 | 4.85 | 2.26 | 1.62 | 0.97 |
| X-ray diffractogram | | | | | | | | |
| peak angle (2θ) | ° | 3.90 | 3.20 | 4.10 | ~ | ~ | ~ | ~ |
| d-spacing | (Å) | 22.63 | 27.58 | 21.53 | ~ | ~ | ~ | ~ |
| peak intensity | (kcps) | 0.95 | 1.08 | 0.43 | ~ | ~ | ~ | ~ |

Note:
[1]CCH-02(1/7) solution was formed by uniformly dispersing a homogeneous 0.5 wt % clay solution in a 2.0 wt % CPE solution (solution C of embodiment 1), wherein the concentration of clay is 0.38 wt % and the concentration of CPE is 0.49 wt %.
[2]SBR latex was formed by adding water to high concentration SBR latex to form a latex of solid content of 2.35 wt %.
[3]The amount of Clay/SBR added is the ratio of the weight of clay to that of SBR.

Comparative Embodiment 2: Preparation of Clay/PMMA Mixture

Untreated kunipia F was added in water and the concentration was adjusted to form a 0.5 wt % well-dispersed clay solution A. Latex B was formed by adding PMMA latex with water and the solid concentration was adjusted to 2.6 wt %. Different amounts of clay solution A were poured into a certain amount of PMMA latex B and the mixture was mixed completely to form a uniform latex. Then a few drops of CaCl$_2$ solution were added to form a precipitate. After the precipitate was separated by a centrifuge, it was washed with water and dried. Consequently, clay/PMMA mixtures with different amounts of clay were obtained. The compositions is listed in Table 4. From the graph of X-ray diffractogram (FIG. 7), it is discovered that regardless of the amounts of clay, an obvious absorbent peak was present when angle 2θ is about between 6.6 and 7.2 degrees. The lattice spacing of clay is about 1.2 nm. As the amount of clay increases, the intensity of absorbent peaks increases (CCM-30~CCM-36). However, the graph of the X-ray of the pure clay (FIG. 2) shows an absorbent peak when angle 2θ is 7.0 degrees (the lattice spacing was calculated as 1.2 nm). Comparing the two, it is shown that the lattice spacing of the clay/PMMA mixture was not evidently opened.

TABLE 4

| Sample | | CCM-30 | CCM-31 | CCM-32 | CCM-33 | CCM-34 | CCM-35 | CCM-36 |
|---|---|---|---|---|---|---|---|---|
| Clay/H$_2$O[(1)] | g | 60 | 30 | 15 | 8 | 5 | 3 | 2 |
| Clay weight | g | 0.3 | 0.15 | 0.075 | 0.032 | 0.02 | 0.012 | 0.008 |
| PMMA Latex[(2)] | g | 50 | 50 | 50 | 50 | 50 | 50 | 50 |
| PMMA weight | g | 1.300 | 1.300 | 1.300 | 1.300 | 1.300 | 1.300 | 1.300 |
| CaCl$_2$[(3)] | ml | 15 | 15 | 15 | 11 | 11 | 10 | 10 |
| coagulant weight | g | 1.09 | 1.07 | 1.09 | 0.41 | 0.98 | 0.93 | 0.9 |
| efficiency | % | 68.13% | 73.79% | 79.27% | 30.78% | 74.24% | 70.88% | 68.81% |
| amount of Clay/PMMA[(4)] | % | 23.08 | 11.54 | 5.77 | 2.46 | 1.54 | 0.92 | 0.62 |
| X-ray diffractogram | | | | | | | | | |
| peak intensity (2θ) | ° | 7.20 | 7.10 | 7.10 | 7.10 | 6.90 | 6.60 | 6.60 |
| d-spacing | (Å) | 12.27 | 12.44 | 12.44 | 12.44 | 12.80 | 13.38 | 13.38 |
| peak intensity | (kcps) | 16.09 | 25.82 | 14.69 | 6.52 | 4.64 | 1.67 | 2.15 |

Note:
[(1)]Clay/H$_2$O solution was formed by adding pure clay kunipia F in water to form a well dispersed 0.5 wt % solution.
[(2)]PMMA solution was formed by adding water to high concentration PMMA latex and the solid content was adjusted to 2.60 wt %.
[(3)]The concentration of the CaCl$_2$ solution is 2.0 wt %.
[(4)]The amount of Clay/SBR is the ratio of the weight of clay to that of SBR.

Embodiment 2: Preparation of Clay/Polyelectrolyte/PMMA Nanocomposite

Same procedure of embodiment 1 was followed. The composition of clay/polyelectrolyte as shown in Table 5 and 6 were added in a certain amount of PMMA latex. The mixture was then stirred to form a uniform latex. After separation by a centrifuge, washing with water and drying, nano clay/PMMA composites with different concentrations of clay were obtained.

The X-ray diffractograms (FIGS. 8 and 9) indicate that when the amount of clay is lower than 10 wt %, (Sample CCM-24, CCM-25, CCM-26 of Table 5; CCM-44, CCM-45, CCM-46 of Table 6) there is no evident absorbent peak present when angle 2θ is between 2 and 10 degrees. This proves that most of the clay layers were opened completely and is dispersed uniformly in SBR substrate, which in turn proves the existence of polyelectrolyte can actually improve the dispersion of clay in SBR. On the other hand, when the amount of clay increases (CCM-22, CCM-21, CCM-20 of Table 5; CCM-42, CCM-41, CCM-40 of Table 6), FIGS. 10 and 11 show that there are weak absorbent peaks present when angle 2θ is between 4.0 and 4.3 degrees (FIG. 10) and between 3.2 and 3.9 degrees (FIG. 11). As the amount of clay increases, the intensity of the absorbent peak also increases. Comparing the position of the absorbent peaks of this embodiment with comparative embodiment 2, it is indicated that the lattice spacing of clay of this embodiment is larger than that of the comparative embodiment 2. It is also noticed that when the two embodiments contain similar content of clay, the peak intensity of this embodiment is evidently smaller, hence there is still a small portion of clay separated by inserting a lattice. Comparing FIGS. 10 and 11, the total number of moles of charges of polyelectrolyte is 5 times the total number of moles of charges of clay, however, the latter is 7 times greater. It is shown that the absorbent peak of FIG. 11 is not evident, which indicates that the polyelectrolyte is able to promote the dispersion of clay in PMMA.

TABLE 5

| Sample | | CCM-20 | CCM-21 | CCM-22 | CCM-24 | CCM-25 | CCM-26 |
|---|---|---|---|---|---|---|---|
| CCH-01(1/5)[(1)] | G | 100 | 50 | 30 | 7 | 5 | 3 |
| Clay weight | g | 0.4 | 0.2 | 0.12 | 0.028 | 0.02 | 0.012 |
| CPE weight | g | 0.37 | 0.185 | 0.111 | 0.0259 | 0.0185 | 0.0111 |
| PMMA Latex[(2)] | g | 50 | 50 | 50 | 50 | 50 | 50 |
| PMMA weight | g | 1.300 | 1.300 | 1.300 | 1.300 | 1.300 | 1.300 |
| coagulant weight | g | 1.3 | 1.59 | 1.02 | 0.8 | 0.58 | 0.86 |
| efficiency | % | 62.80% | 94.36% | 66.62% | 59.09% | 43.33% | 65.00% |
| amount of Clay/PMMA[(3)] | % | 30.77 | 15.38 | 9.23 | 2.15 | 1.54 | 0.92 |
| X-ray diffractogram | | | | | | | |
| peak angle (2θ) | ° | 4.10 | 4.20 | 3.50 | ~ | ~ | ~ |
| d-spacing | (Å) | 21.53 | 21.02 | 25.22 | ~ | ~ | ~ |
| peak intensity | (kcps) | 3.29 | 3.50 | 1.42 | ~ | ~ | ~ |

Note:

TABLE 5-continued

| Sample | CCM-20 | CCM-21 | CCM-22 | CCM-24 | CCM-25 | CCM-26 |
|---|---|---|---|---|---|---|

(1)CCH-0l(1/5) solution was formed by uniformly dispersing a homogeneous 0.5 wt % clay solution in a 2.0 wt % CPE solution (solution C of embodiment 1), wherein the concentration of clay is 0.40 wt % and the concentration of CPE is 0.37 wt %, and the total electric charge of the CPE/clay is 5.
(2)PMMA latex was formed by adding water to high concentration PMMA latex to form a latex of solid content of 2.60 wt %.
(3)The amount of Clay/PMMA added is the ratio of the weight of clay to that of PMMA.

TABLE 6

| Sample | | CCM-40 | CCM-41 | CCM-42 | CCM-44 | CCM-45 | CCM-46 |
|---|---|---|---|---|---|---|---|
| CCH-02(1/7)(1) | g | 100 | 50 | 30 | 7 | 5 | 3 |
| Clay weight | g | 0.38 | 0.19 | 0.114 | 0.0266 | 0.019 | 0.0114 |
| CPE weight | g | 0.49 | 0.245 | 0.147 | 0.0343 | 0.0245 | 0.0147 |
| PMMA Latex(2) | g | 50 | 50 | 50 | 50 | 50 | 50 |
| PMMA weight | g | 1.300 | 1.300 | 1.300 | 1.300 | 1.300 | 1.300 |
| coagulant weight | g | 1.71 | 1.52 | 0.92 | 0.92 | 0.78 | 0.5 |
| efficiency | % | 78.80% | 87.61% | 58.94% | 67.60% | 58.06% | 37.70% |
| amount of Clay/PMMA(3) | % | 29.23 | 14.62 | 8.77 | 2.05 | 1.46 | 0.88 |
| X-ray diffractogram | | | | | | | |
| peak angle (2θ) | ° | 3.60 | 4.00 | 3.80 | ~ | ~ | ~ |
| d-spacing | (Å) | 24.52 | 22.07 | 23.23 | ~ | | |
| Peak intensity | (kcps) | 0.65 | 1.28 | 1.81 | ~ | | |

Note:
(1)CCH-02(1/7) solution was formed by uniformly dispersing a homogeneous 0.5 wt % clay solution in a 2.0 wt % CPE solution (solution C of embodiment 1), wherein the concentration of clay is 0.38 wt % and the concentration of CPE is 0.49 wt %, and the total electric charges of CPE/clay is 7.
(2)PMMA latex was formed by adding water to high concentration PMMA latex to form a latex of solid content of 2.60 wt %.
(3)The amount of Clay/PMMA added is the ratio of the weight of clay to that of PMMA.

The above results show that with polyelectrolyte (CPE), the nanocomposites of the invention is able to achieve a state of "coaggulate".

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A polymer nanocomposite, comprising:
   60~99 wt % of high molecular substrate;
   0.5~30 wt % of layer structured inorganic, well dispersed, coated evenly on the high molecular substrate; and
   0.5~30 wt % of polyelectrolyte, which carries the opposite charge of the layer-structured inorganic material and it is attached onto the layer-structured inorganic material.

2. The polymer nanocomposite as claimed in claim 1, wherein the high molecular substrate is selected from the group consisting of styrene-butadiene rubber, isopiperylene rubber, butadiene rubber, acrylonitrile-butadiene rubber, natural rubber, PVC, PS, PMMA, PU and combinations thereof.

3. The polymer nanocomposite as claimed in claim 2, wherein the original state of the high molecular substrate is latex.

4. The polymer nanocomposite as claimed in claim 3, wherein the latex is styrene-butadiene rubber latex and PMMA latex.

5. The polymer nanocomposite as claimed in claim 1, wherein the layer-structured inorganic material is selected from clay, and its cationic ion exchange equivalent is between 30 and 200 meq/100 g.

6. The polymer nanocomposite as claimed in claim 5, wherein the layer-structured inorganic material is selected from the group consisting of smectite clay, vermiculite, halloysite, sericite and fluoro-mica.

7. The polymer nanocomposite as claimed in claim 6, wherein the smectite clay is selected from the group consisting of montmorillonite, saponite, beidellite, nontronite, hectorite and stevensite.

8. The polymer nanocomposite as claimed in claim 1, wherein the polyelectrolyte is cationic polyelectrolyte.

9. The polymer nanocomposite as claimed in claim 8, wherein the cationic polyelectrolyte is selected from the group consisting of poly(diallyl dimethylammonium chloride), poly (4-vinyl pyridine) and combinations thereof.

10. The polymer nanocomposite as claimed in claim 9, wherein the total charge mole number of the polyelectrolyte is 1 to 10 times that of the layer-structured inorganic material.

11. A method of preparing a polymer nanocomposite, comprising the steps of:
   (a). combining a layer structured inorganic solution with a polyelectrolyte solution to obtain a mixture solution, the polyelectrolyte has opposite and over amount of charges with respect to the layer-structured inorganic material, which the polyelectrolyte is attached on the layer-structured inorganic material; and (b). combining the obtained mixture solution with a polymer latex, the polymer latex carries opposite charges with respect to the polyelectrolyte, by way of co-agglutination, a layer-structured inorganic/polyelectrolyte/polymer nanocomposite is obtained.

12. The method as claimed in claim 11, wherein the solution includes organic solvents.

13. The method as claimed in claim 11, wherein the polymer latex is selected from the group consisting of styrene-butadiene rubber, isopiperylene rubber, butadiene rubber, acrylonitrile-butadiene rubber, natural rubber, PVC, PS, PMMA, PU and combinations thereof.

14. The method as claimed in claim 13, wherein the polymer latex is styrene-butadiene rubber latex and PMMA latex.

15. The method as claimed in claim 11, wherein the layer-structured inorganic material is selected from clay, and its cationic ion exchange equivalent is between 30 and 200 meq/100 g.

16. The method as claimed in claim 15, wherein the layer-structured inorganic material is selected from the group consisting of smectite clay, vermiculite, halloysite, sericite and fluoro-mida.

17. The method as claimed in claim 16, wherein the smectite clay is selected from the group consisting of montmorillonite, saponite, beidellite, nontronite, hectorite and stevensite.

18. The method as claimed in claim 11, wherein the polyelectrolyte is cationic polyelectrolyte.

19. The method as claimed in claim 18, wherein the cationic polyelectrolyte is selected from the group consisting of poly(diallyl dimethylammonium chloride), poly (4-vinyl pyridine) and combinations thereof.

20. The method as claimed in claim 9, wherein the total charge mole number of the polyelectrolyte is 1 to 10 times that of the layer-structured inorganic material.

* * * * *